(12) United States Patent
Hirayama

(10) Patent No.: US 11,146,708 B2
(45) Date of Patent: Oct. 12, 2021

(54) IMAGE READING DEVICE

(71) Applicant: KYOCERA Document Solutions Inc., Osaka (JP)

(72) Inventor: Hayato Hirayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/906,865

(22) Filed: Jun. 19, 2020

(65) Prior Publication Data

US 2020/0404118 A1  Dec. 24, 2020

(30) Foreign Application Priority Data

Jun. 24, 2019 (JP) .............................. JP2019-116279

(51) Int. Cl.
*H04N 1/10* (2006.01)

(52) U.S. Cl.
CPC ........... *H04N 1/1017* (2013.01); *H04N 1/103* (2013.01); *H04N 2201/0081* (2013.01)

(58) Field of Classification Search
CPC ................. H04N 1/1017; H04N 1/103; H04N 2201/0081; H04N 1/1013; H04N 2201/02404; H04N 2201/02414; H04N 2201/02425; H04N 2201/02427; H04N 2201/02447; H04N 2201/0456
USPC ......................................................... 358/474
See application file for complete search history.

(56) References Cited

U.S. PATENT DOCUMENTS

| 6,008,830 | A | * | 12/1999 | Yamada | B41J 2/32 347/171 |
| 7,091,571 | B1 | * | 8/2006 | Park | H01L 27/14618 257/432 |
| 8,496,312 | B2 | * | 7/2013 | Sakurada | B41J 2/04503 347/14 |
| 8,960,851 | B2 | * | 2/2015 | Sonehara | B41J 2/07 347/19 |
| 2004/0159927 | A1 | * | 8/2004 | Loo | G01L 19/143 257/678 |
| 2006/0080687 | A1 | * | 4/2006 | Miyashita | B41J 3/4071 720/603 |
| 2006/0193014 | A1 | * | 8/2006 | Kageyama | H04N 1/031 358/474 |

(Continued)

FOREIGN PATENT DOCUMENTS

JP  07023189 A  1/1995

*Primary Examiner* — Negussie Worku
(74) *Attorney, Agent, or Firm* — Alleman Hall Creasman & Tuttle LLP

(57) ABSTRACT

A guide mechanism guides a carriage from a first position to a second position in a sub scanning direction, guides the carriage from the second position to a third position that is different, in a main scanning direction, from the second position, guides the carriage from the third position to a fourth position in the sub scanning direction, and guides the carriage from the fourth position to the first position. A first interval maintaining portion maintains a first interval between the carriage and a platen glass when the carriage moves in a first driving direction in a scan range in the sub scanning direction. A second interval maintaining portion maintains a second interval between the carriage and the platen glass when the carriage moves in a second driving direction in the scan range, the second interval being different from the first interval.

7 Claims, 11 Drawing Sheets

(56) References Cited

U.S. PATENT DOCUMENTS

| | | | |
|---|---|---|---|
| 2007/0109613 A1* | 5/2007 | Sakakibara | H04N 1/1013 358/486 |
| 2008/0316550 A1* | 12/2008 | Oguchi | H04N 1/1043 358/494 |
| 2011/0176182 A1* | 7/2011 | Otsuki | H04N 1/00559 358/474 |
| 2011/0298854 A1* | 12/2011 | Sakurada | B41J 29/393 347/14 |
| 2014/0063572 A1* | 3/2014 | Yamasaki | H04N 1/123 358/497 |
| 2015/0264215 A1* | 9/2015 | Takahashi | H04N 1/1008 358/474 |
| 2017/0180579 A1* | 6/2017 | Suga | H04N 1/00559 |
| 2017/0374217 A1* | 12/2017 | Ishida | H04N 1/00018 |
| 2018/0013914 A1* | 1/2018 | Suzuki | H04N 1/04 |
| 2018/0288253 A1* | 10/2018 | Maeda | H04N 1/00408 |

* cited by examiner

IMAGE READING DEVICE

INCORPORATION BY REFERENCE

This application is based upon and claims the benefit of priority from the corresponding Japanese Patent Application No. 2019-116279 filed on Jun. 24, 2019, the entire contents of which are incorporated herein by reference.

BACKGROUND

The present disclosure relates to an image reading device of a flatbed system.

An image reading device of a flatbed system includes a platen glass and a carriage, wherein the platen glass is a document sheet table, and the carriage moves in a sub scanning direction along a lower surface of the platen glass. The carriage may support a CIS (Contact Image Sensor) unit in a state of being along a main scanning direction.

Typically, the CIS unit has a shallower focal depth than a CCD sensor. As a result, when a part of the document sheet is separated from the platen glass, a part of a read image obtained by the CIS unit becomes a dark shadow image different from the original image.

In addition, there is known an image reading device that includes: a mechanism that changes the height of the platen glass depending on a specified reading mode; and a correction circuit that changes the level of a read signal of the image sensor depending on the reading mode.

When the CIS unit is located close to the platen glass, the focus position of the CIS unit approaches the part of the document sheet that is separated from the platen glass. This makes it possible for the CIS unit to obtain the original image or an image near to the original image from the part of the document sheet that is separated from the platen glass.

SUMMARY

An image reading device according to an aspect of the present disclosure includes a carriage, a drive device, a guide mechanism, and an interval maintaining member. The carriage is supported in such a way as to move along a lower surface of a platen glass, and is configured to support a contact image sensor unit such that the contact image sensor unit can approach and separate from the platen glass in a state of being along a main scanning direction, and to elastically bias the contact image sensor unit toward the platen glass. The drive device is configured to apply a driving force to the carriage in a first driving direction or a second driving direction that go along a sub scanning direction perpendicular to the main scanning direction, the second driving direction being opposite to the first driving direction. The guide mechanism is configured to guide a moving direction of the carriage to which the driving force is applied. The interval maintaining member is provided along a lower surface of the platen glass and configured to maintain a predetermined interval between the contact image sensor unit and the platen glass by coming in contact with an upper slide portion on an upper surface of the contact image sensor unit. In a case where a driving force in the first driving direction is applied to the carriage in a state where the carriage is located at a predetermined first position, the guide mechanism guides the carriage from the first position to a predetermined second position in the sub scanning direction; after the carriage reaches the second position, the guide mechanism guides the carriage from the second position to a third position that is different, in the main scanning direction, from the second position; in a case where a driving force in the second driving direction is applied to the carriage in a state where the carriage is located at the third position, the guide mechanism guides the carriage from the third position to a predetermined fourth position in the sub scanning direction; and after the carriage reaches the fourth position, the guide mechanism guides the carriage from the fourth position to the first position. The interval maintaining member includes a first interval maintaining portion and a second interval maintaining portion. The first interval maintaining portion is configured to maintain a predetermined first interval between the carriage and the platen glass when the carriage moves in the first driving direction in a predetermined scan range in the sub scanning direction. The second interval maintaining portion is configured to maintain a predetermined second interval between the carriage and the platen glass when the carriage moves in the second driving direction in the scan range, the second interval being different from the first interval.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Image Reading Device 1]

The image reading device 1 according to an embodiment is configured to execute an image reading process by a flatbed system. In the image reading process, an image is read from a document sheet 9.

Figure 1:
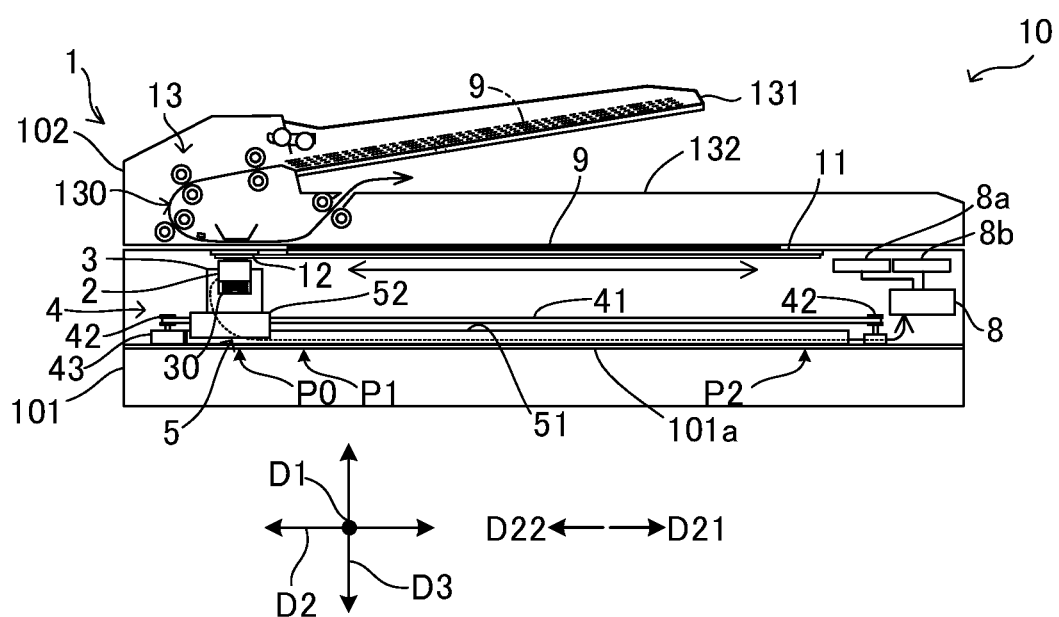
FIG. 1 is a diagram showing a configuration of an image reading device according to an embodiment.

As shown in FIG. 1, the image reading device 1 includes a main body portion 101 and a document sheet cover 102. The main body portion 101 is a housing storing equipment regarding the image reading process. Apart of an upper surface of the main body portion 101 is composed of a platen glass 11. The platen glass 11 is a transparent document sheet table.

The document sheet cover 102 is supported by the main body portion 101 and configured to cover the upper surface of the main body portion 101. The document sheet cover 102 is supported in such a way as to be displaced between a closing position and an opening position, wherein at the closing position, the document sheet cover 102 covers the upper surface of the main body portion 101, and at the opening position, the document sheet cover 102 is separated from the upper surface of the main body portion 101.

The image reading device 1 includes a CIS unit 2, a carriage 3, a drive device 4, and a guide mechanism 5. The carriage 3 supports the CIS unit 2.

Figure 3:
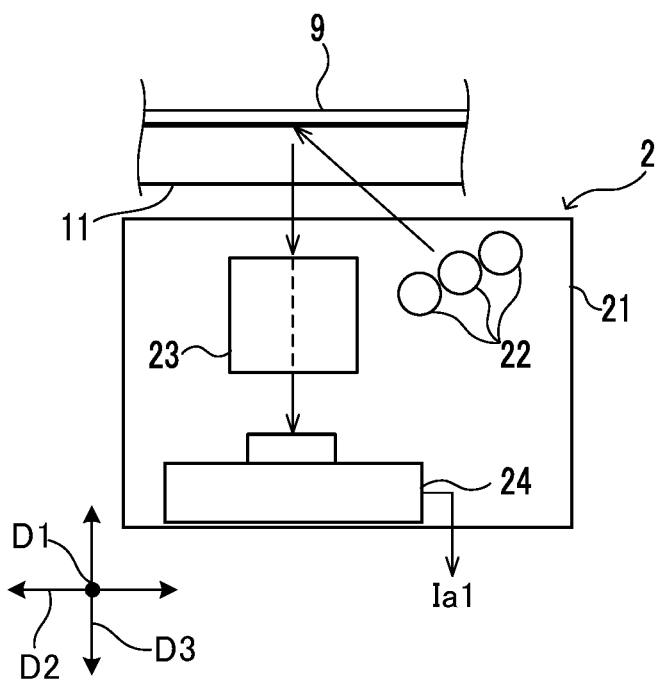
FIG. 3 is a diagram showing a configuration of a CIS unit.

As shown in FIG. 3, the CIS unit 2 includes a unit base 21, light sources 22 of three colors, a lens 23, and an image sensor 24. The unit base 21 integrally holds the light sources 22, the lens 23, and the image sensor 24.

The light sources 22 are three single-color light sources that respectively emit red, green, and blue lights. The unit base 21, the light sources 22, the lens 23, and the image sensor 24 are formed to extend linearly. That is, the CIS unit 2 is formed to extend linearly.

In the following description, the longitudinal direction of the CIS unit 2 disposed in the main body portion 101 is referred to as a main scanning direction D1. As described below, the carriage 3 supporting the CIS unit 2 is supported in such a way as to move along a sub scanning direction D2 perpendicular to the main scanning direction D1.

In the accompanying drawings, a direction perpendicular to the main scanning direction D1 and the sub scanning direction D2 is shown as a height direction D3.

The light sources 22 emit lights of three colors toward a line area that, in the document sheet 9, extends along the main scanning direction D1. For example, each of the light sources 22 may be an LED array that includes a plurality of light emitting diodes arranged in alignment along the main scanning direction D1.

In a case where the document sheet 9 is placed on the platen glass 11, the light sources 22 emit lights of three colors from below the platen glass 11 toward the line area of the document sheet 9.

The lens 23 collects light reflected on the line area of the document sheet 9 into a light receiving portion of the image sensor 24. The image sensor 24 is a line sensor that detects an amount of light diffused and reflected on the line area of the document sheet 9.

The image sensor 24 is a photoelectric conversion element array including a plurality of photoelectric conversion elements aligned along the main scanning direction D1. For example, each of the photoelectric conversion elements is a CMOS image sensor.

The image sensor 24 outputs an analog line image signal Ia1 that represents an amount of light diffused and reflected on the line area of the document sheet 9. The line image signal Ia1 represents the density of a line image that is an image of the line area of the document sheet 9.

The focus position of the CIS unit 2 is determined by the focal distance of the lens 23. The closer to the focus position the document sheet 9 is, the clearer the read image is.

The carriage 3 is supported in such a way as to move along the lower surface of the platen glass 11. The carriage 3 supports the CIS unit 2 such that the CIS unit 2 can approach and separate from the platen glass 11 in a state of being along the main scanning direction D1. The carriage 3 includes springs 30. The carriage 3 elastically biases the CIS unit 2 toward the platen glass 11 by the elastic force of the springs 30.

Figure 5:
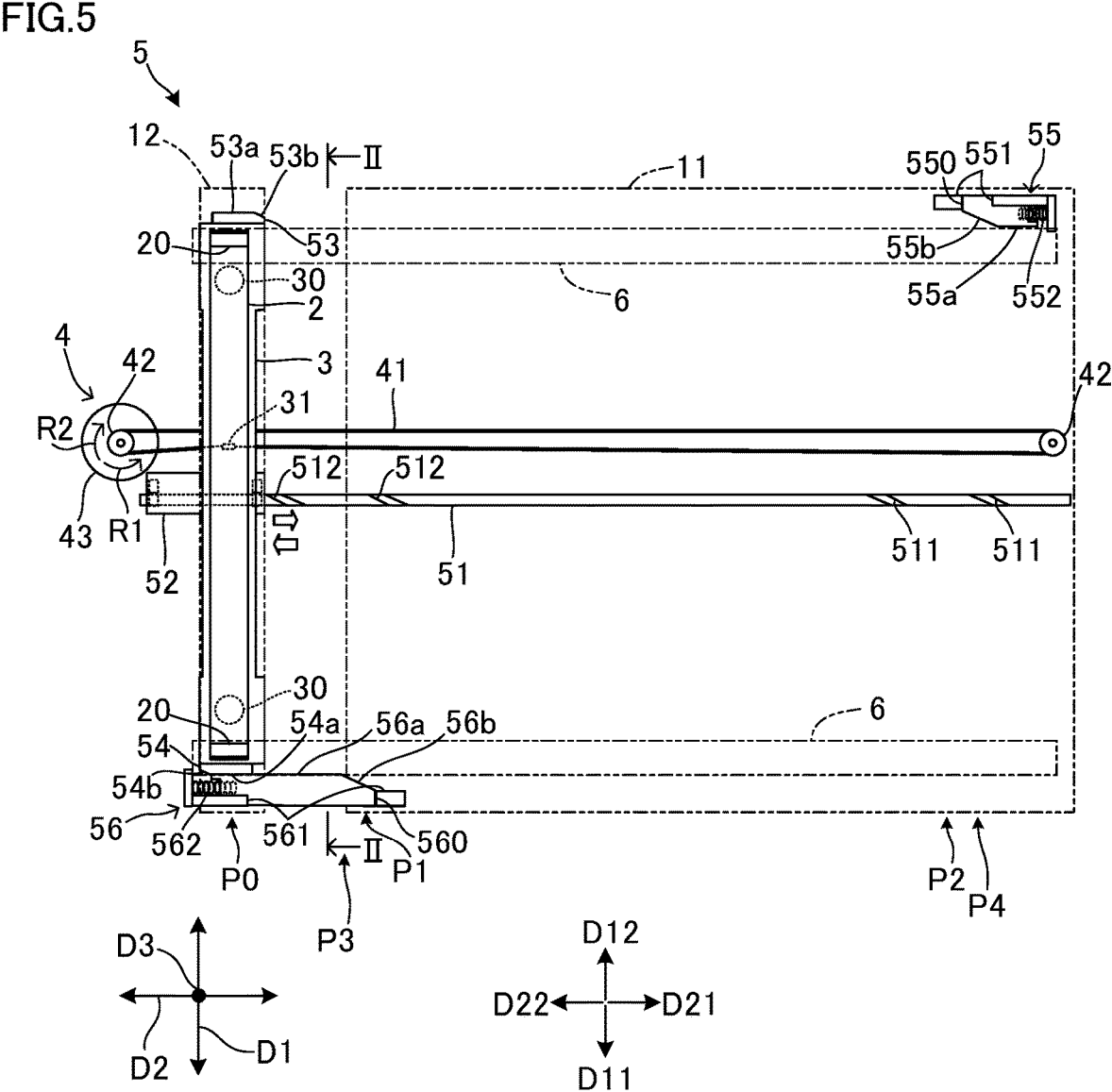
FIG. 5 is a plan diagram of a drive mechanism and a guide mechanism when a carriage is located at a stop reading position in the image reading device according to the embodiment.
Figure 6:
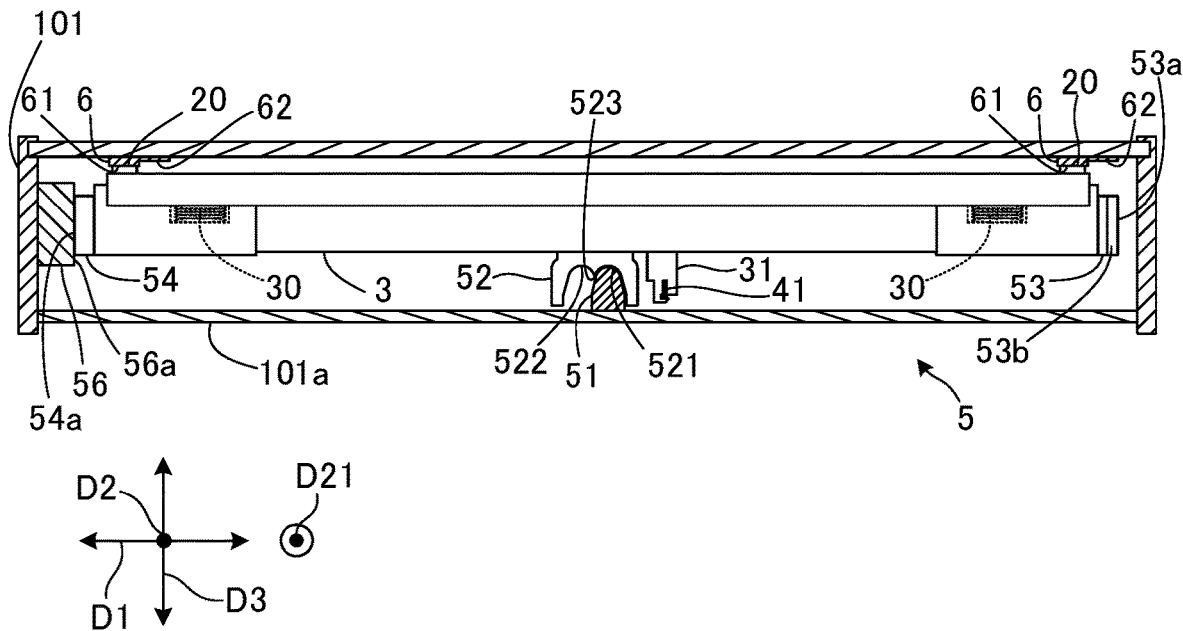
FIG. 6 is a cross-sectional diagram of the main body portion of the image reading device according to the embodiment.

As shown in FIG. 6, the carriage 3 elastically biases the CIS unit 2 toward the platen glass 11 by the two springs 30 disposed close to opposite ends of the carriage 3 in the main scanning direction D1. It is noted that FIG. 6 shows a cross section of the image reading device 1 taken along a II-II plane shown in FIG. 5.

The drive device 4 applies a driving force to the carriage 3 in a first driving direction D21 or a second driving direction D22 that go along the sub scanning direction D2. The second driving direction D22 is opposite to the first driving direction D21.

For example, the drive device 4 includes an endless belt 41, a pair of pulleys 42, and a motor 43 that rotationally drives one of the pair of pulleys 42. The pair of pulleys 42 are respectively fixed at two locations along the sub scanning direction D2.

The belt 41 is stretched over the pair of pulleys 42. As shown in FIG. 6, a belt coupling portion 31 is formed to project from the lower surface of the carriage 3. A part of the belt coupling portion 31 is coupled to the carriage 3 by the belt coupling portion 31.

As the motor 43 rotates in a first rotation direction R1, the belt 41 applies a driving force in the first driving direction D21 to the carriage 3, and as the motor 43 rotates in a second rotation direction R2, the belt 41 applies a driving force in the sub scanning direction D2 to the carriage 3 (see FIG. 5).

The guide mechanism 5 guides the moving direction of the carriage 3 to which the driving force is applied by the drive device 4. Details of the guide mechanism 5 are described below.

In the following description, predetermined two positions along the sub scanning direction D2 are referred to as a first scan end P1 and a second scan end P2. The second scan end P2 is downstream of the first scan end P1 in the first driving direction D21.

When the carriage 3 moves in the sub scanning direction D2 in a range from the first scan end P1 to the second scan end P2, the CIS unit 2 reads an image from the document sheet 9 on the platen glass 11.

In the present embodiment, the image reading device 1 further includes a contact glass 12, and an ADF (Automatic Document Feeder) 13, wherein the contact glass 12 constitutes a part of the upper surface of the main body portion 101, and the ADF 13 is built in the document sheet cover 102.

The ADF 13 feeds the document sheet 9 placed on a document sheet tray 131 to a document sheet conveyance path 130 formed in the document sheet cover 102, conveys the document sheet 9 along the document sheet conveyance path 130, and then discharges the document sheet 9 from the document sheet conveyance path 130 onto a discharge tray 132.

In a state where the document sheet cover 102 is closed, the document sheet conveyance path 130 passes the upper surface of the contact glass 12. In the following description, a predetermined position in the sub scanning direction D2 below the contact glass 12 is referred to as a stop reading position P0. The stop reading position P0 is upstream of the first scan end P1 in the first driving direction D21.

In a state where the carriage 3 stops at the stop reading position P0, the CIS unit 2 reads an image from the document sheet 9 that is being conveyed by the ADF 13 and passing over the contact glass 12.

Figure 2:
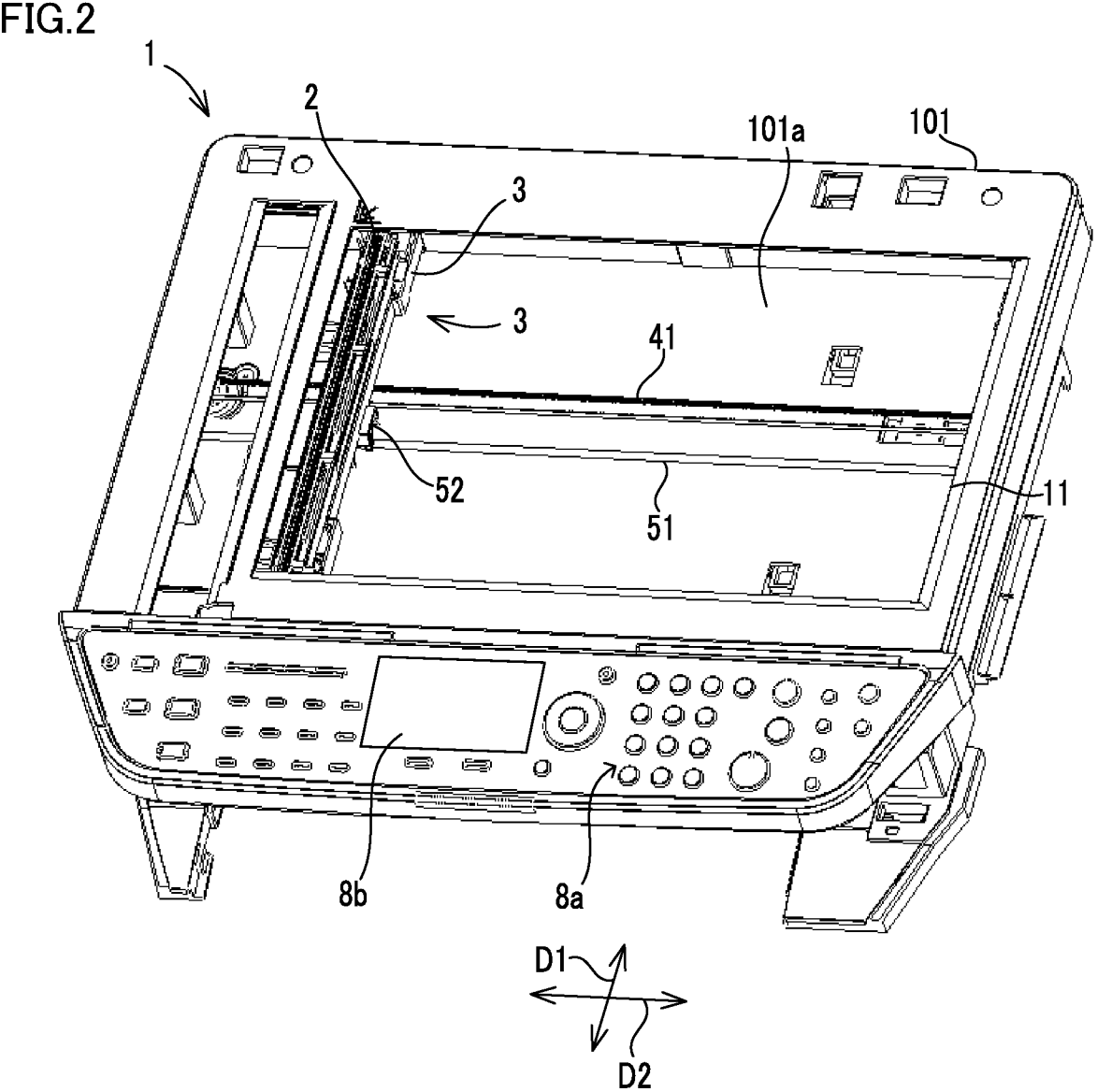
FIG. 2 is a perspective diagram of a main body portion of the image reading device according to the embodiment.

The image reading device 1 further includes a data processing device 8, an operation device 8a, and a display device 8b (see FIG. 1, FIG. 2).

The operation device 8a is configured to receive human operations, and, for example, includes operation buttons and a touch panel. The display device 8b is configured to display information, and, for example, is a panel display device such as a liquid crystal display panel.

Figure 4:
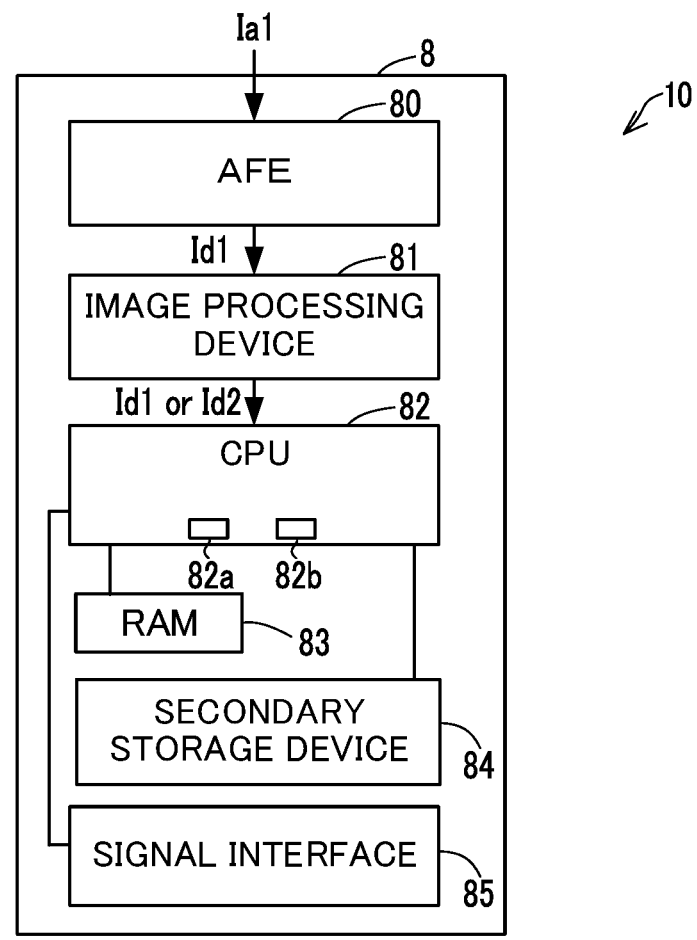
FIG. 4 is a block diagram showing a configuration of a data processing portion of the image reading device according to the embodiment.

As shown in FIG. 4, the data processing device 8 includes an AFE (Analog Front End) 80, an image processing device 81, a CPU (Central Processing Unit) 82, RAM (Random Access Memory) 83, a secondary storage device 84, and a signal interface 85.

The AFE 80 performs a process to adjust the level of the line image signal Ia1, and a process to convert the line image signal Ia1 to digital primary image data Id1. For example, the AFE 80 is realized as a circuit such as an ASIC (Application Specific Integrated Circuit) or as a processor such as a DSP (Digital Signal Processor).

The image processing device 81 executes various image processes based on the primary image data Id1. The image processing device 81 executes a process to generate secondary image data Id2 by modifying the primary image data Id1. The image processing device 81 is realized as a processor such as the DSP or a MPU (Micro Processing Unit).

The image processing device 81 supplies the primary image data Id1 or the secondary image data Id2 to the CPU 82 in response to a command from the CPU 82.

The CPU 82 operates as a motor control device 82a, a CIS control device 82b or the like when it executes a predetermined program. The motor control device 82a controls the motor 43 of the drive device 4. The CIS control device 82b controls the image sensor 24 of the CIS unit 2.

The secondary storage device 84 is a computer-readable nonvolatile storage device. The secondary storage device 84 is configured to store programs executed by the CPU 82, and various types of data. For example, either or both of a flash memory and a hard disk drive are adopted as the secondary storage device 84.

The RAM 83 is a volatile storage device configured to primarily store: the programs executed by the CPU 82; and data that is output or consulted by the CPU 82 during execution of the programs.

The signal interface 85 converts detection signals of various sensors to digital data, and sends the digital data to the CPU 82. Furthermore, the signal interface 85 converts a control command output from the CPU 82 into a control signal such as a current signal or a voltage signal, and outputs the control signal to a control-target device such as the image sensor 24 or the motor 43.

Typically, the CIS unit 2 has a shallower focal depth than the CCD sensor. As a result, when a part of the document sheet 9 is separated from the platen glass 11, a part of a read image obtained by the CIS unit 2 becomes a dark shadow image different from the original image.

On the other hand, when the CIS unit 2 is located close to the platen glass 11, the focus position of the CIS unit 2 approaches the part of the document sheet 9 that is separated from the platen glass 11. This makes it possible for the CIS unit 2 to obtain the original image or an image near to the original image from the part of the document sheet 9 that is separated from the platen glass 11.

Given that the image reading device 1 has a mechanism to change the height of the platen glass 11, it would be possible to allow the focus position of the CIS unit 2 to approach the part of the document sheet 9 that is separated from the platen glass 11.

Meanwhile, to displace the platen glass 11 with high precision, a very precise displacement mechanism is required. However, when the difficulty of adjustment and the cost are taken into consideration, it is not preferable to add a precise displacement mechanism to the image reading device 1.

Figure 8:
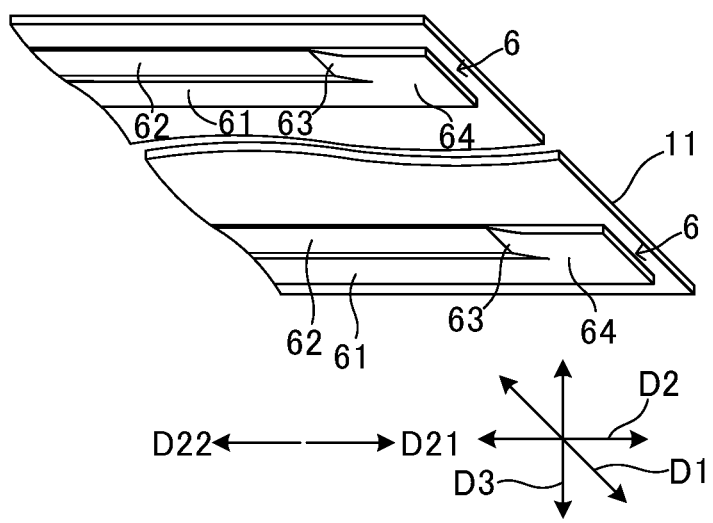
FIG. 8 is a perspective diagram of end portions of interval maintaining members on a downstream side in a first driving direction in the image reading device according to the embodiment.
Figure 9:
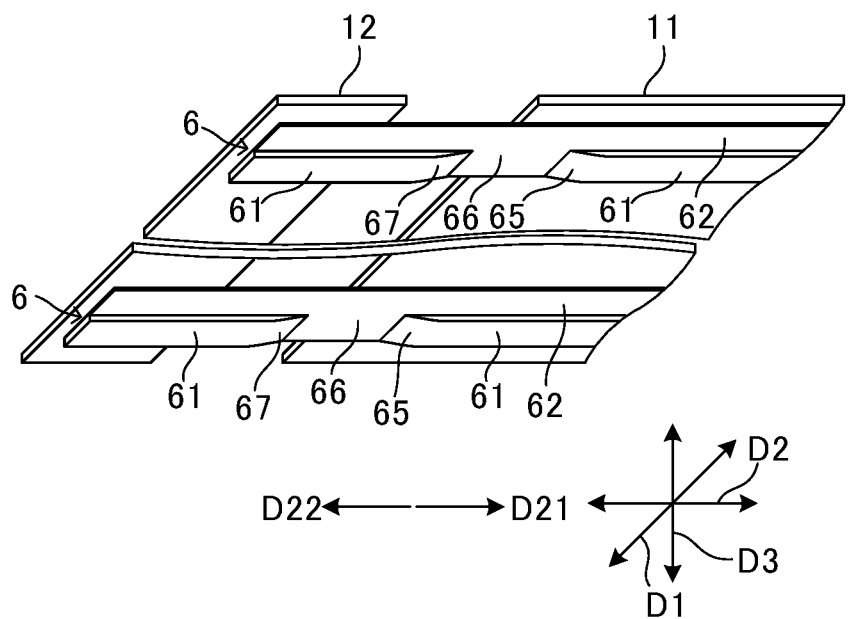
FIG. 9 is a perspective diagram of end portions of the interval maintaining members on a downstream side in a second driving direction in the image reading device according to the embodiment.

On the other hand, the image reading device 1 includes the guide mechanism 5 and a pair of interval maintaining members 6 as shown in FIG. 6, FIG. 8, and FIG. 9. This allows the image reading device 1 to, by a simple configuration, change the interval between the platen glass 11 and the CIS unit 2. With this configuration, the image reading device 1 can obtain read images near to the original images from both a part of the document sheet 9 that is close to the platen glass 11 and a part of the document sheet 9 that is separated from the platen glass 11.

[Interval Maintaining Member 6]

As shown in FIG. 6, a pair of upper slide portions 20 that project more than the other portions are respectively formed at opposite end portions of the upper surface of the CIS unit 2 in the main scanning direction D1.

The pair of interval maintaining members 6 are attached to the lower surface of the platen glass 11 in such a way as to face the pair of upper slide portions 20. That is, the pair of interval maintaining members 6 are provided along the lower surface of the platen glass 11. The pair of interval maintaining members 6 are formed to extend in the sub scanning direction D2.

In the present embodiment, each of the pair of interval maintaining members 6 includes a first interval maintaining portion 61 and a second interval maintaining portion 62. The first interval maintaining portion 61 and the second interval maintaining portion 62 are formed to extend in the sub scanning direction D2.

The first interval maintaining portion 61 and the second interval maintaining portion 62 are formed to have predetermined thicknesses along the sub scanning direction D2. The first interval maintaining portion 61 is larger in thickness than the second interval maintaining portion 62. Accordingly, the distance from the lower surface of the first interval maintaining portion 61 to the lower surface of the platen glass 11 is larger than the distance from the lower surface of the second interval maintaining portion 62 to the lower surface of the platen glass 11.

In addition, as shown in FIG. 8, each of the pair of interval maintaining members 6 includes a first transfer portion 64 at an end portion on the downstream side in the first driving direction D21, wherein the first transfer portion 64 is formed such that a surface thereof is flush with a surface of the first interval maintaining portion 61. Furthermore, each of the pair of interval maintaining members 6 includes a first slant surface 63 that continues from a surface of an end portion of the second interval maintaining portion 62 on the downstream side in the first driving direction D21 to the surface of the first transfer portion 64.

In addition, as shown in FIG. 9, each of the pair of interval maintaining members 6 includes a second transfer portion 66 between the stop reading position P0 and the first scan end P1 in the sub scanning direction D2, wherein the second transfer portion 66 is formed such that a surface thereof is flush with a lower surface of the second interval maintaining portion 62. The second transfer portion 66 parts the first interval maintaining portion 61 in two in the sub scanning direction D2. Furthermore, each of the pair of interval maintaining members 6 includes a second slant surface 65 that continues from a surface of the second transfer portion 66 to a surface of the first interval maintaining portion 61 that is on the first driving direction D21 side of the second transfer portion 66. Furthermore, each of the pair of interval maintaining members 6 includes a third slant surface 67 that continues from the surface of the second transfer portion 66 to a surface of the first interval maintaining portion 61 that is on the second driving direction D22 side of the second transfer portion 66.

The pair of interval maintaining members 6 maintain a predetermined interval between the CIS unit 2 and the platen glass 11 by coming in contact with the pair of upper slide portions 20 on the upper surface of the CIS unit 2.

[Guide Mechanism 5]

As shown in, for example, FIG. 2, FIG. 5, and FIG. 6, the guide mechanism 5 includes a rail member 51, a lower slide member 52, a first horizontal contact portion 53, a second horizontal contact portion 54, a first biasing portion 55, and a second biasing portion 56.

The rail member 51 is fixed to a support plate 101a below the carriage 3. The support plate 101a is a part of the main body portion 101. The rail member 51 is formed to extend in the sub scanning direction D2.

Figure 7:
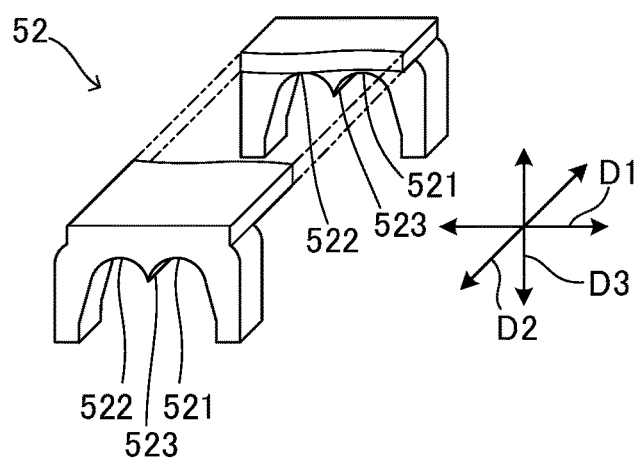
FIG. 7 is a perspective diagram of a lower slide member of the image reading device according to the embodiment.

The lower slide member 52 is formed integrally with the carriage 3 on a lower surface of the carriage 3. As shown in FIG. 7, in the lower slide member 52, a first concave portion 521 and a second concave portion 522 are formed adjacent to each other in the main scanning direction D1. A convex, boundary portion 523 is formed between the first concave portion 521 and the second concave portion 522.

The first concave portion 521 and the second concave portion 522 have shapes in which the rail member 51 fits. In a state where the rail member 51 fits in the first concave portion 521 or the second concave portion 522, the lower slide member 52 can slide on the rail member 51 in the sub scanning direction D2.

In an initial state, in a state where the rail member 51 fits in the first concave portion 521, the carriage 3 is supported by the rail member 51.

The carriage 3 is held in a predetermined attitude when the lower slide member 52 is supported by the rail member 51, and the pair of upper slide portions 20 are in contact with the pair of interval maintaining members 6.

In the following description, a position of the carriage 3 in the main scanning direction D1 in the state where the rail member 51 fits in the first concave portion 521 is referred to as a reference position. In addition, a position of the carriage 3 in the main scanning direction D1 in the state where the rail member 51 fits in the second concave portion 522 is referred to as a shift position. The shift position is different, in the main scanning direction D1, from the reference position.

A first side of the rail member 51 in the main scanning direction D1 is referred to as a reference side, and a side opposite to the first side is referred to as a shift side. In the state where the rail member 51 fits in the first concave portion 521, the second concave portion 522 is located on the reference side. In the state where the rail member 51 fits in the second concave portion 522, the first concave portion 521 is located on the shift side.

In the drawings, a direction to go from the reference side to the shift side is shown as a shift direction D11, and a direction to go from the shift side to the reference side is shown as a return direction D12.

When the carriage 3 is located at the reference position, the pair of upper slide portions 20 come in contact with the first interval maintaining portions 61 of the pair of interval maintaining members 6. When the carriage 3 is located at the shift position, the pair of upper slide portions 20 come in contact with the second interval maintaining portions 62 of the pair of interval maintaining members 6.

In addition, when the carriage 3 moves in the sub scanning direction D2, the first concave portion 521 or the second concave portion 522 of the lower slide member 52 slides on the rail member 51, and the pair of upper slide portions 20 slide under the lower surfaces of the first interval maintaining portions 61 or the second interval maintaining portions 62 of the pair of interval maintaining members 6.

In the example shown in FIG. 7, the lower slide member 52 includes a pair of first concave portions 521 formed with an interval therebetween in the sub scanning direction D2, and a pair of second concave portions 522 formed with an interval therebetween in the sub scanning direction D2. This configuration stabilizes the attitude of the carriage 3 when the lower slide member 52 slides on the rail member 51 in the state where the rail member 51 fits in the first concave portion 521 or the second concave portion 522.

When a driving force in the first driving direction D21 is applied to the carriage 3 in the state where the rail member 51 fits in the first concave portion 521, the rail member 51 guides the carriage 3 in the sub scanning direction D2 from a forward-way start point P3 to the second scan end P2. The forward-way start point P3 is a predetermined position in the sub scanning direction D2 that is upstream of the first scan end P1 in the first driving direction D21. It is noted that the forward-way start point P3 is downstream of the stop reading position P0 in the first driving direction D21 (see FIG. 5).

When a driving force in the second driving direction D22 is applied to the carriage 3 in the state where the rail member 51 fits in the second concave portion 522, the rail member 51 guides the carriage 3 in the sub scanning direction D2 from a return start point P4 to the first scan end P1. The return start point P4 is a predetermined position in the sub scanning direction D2 that is downstream of the second scan end P2 in the first driving direction D21 (see FIG. 5).

That is, the rail member 51 guides the carriage 3 from the forward-way start point P3 to the second scan end P2 in the sub scanning direction D2 while holding the carriage 3 to which the driving force in the first driving direction D21 is applied, at the reference position in the main scanning direction D1.

Similarly, the rail member 51 guides the carriage 3 from the return start point P4 to the first scan end P1 in the sub scanning direction D2 while holding the carriage 3 to which the driving force in the second driving direction D22 is applied, at the shift position in the main scanning direction D1.

A position of the carriage 3, when it is located at the reference position in the main scanning direction D1 and at the forward-way start point P3 in the sub scanning direction D2, is an example of the first position. In addition, a position of the carriage 3, when it is located at the reference position in the main scanning direction D1 and at the second scan end P2 in the sub scanning direction D2, is an example of the second position.

Furthermore, a position of the carriage 3, when it is located at the shift position in the main scanning direction D1 and at the return start point P4 in the sub scanning direction D2, is an example of the third position. In addition, a position of the carriage 3, when it is located at the shift position in the main scanning direction D1 and at the first scan end P1 in the sub scanning direction D2, is an example of the fourth position.

The first horizontal contact portion 53 is provided at an end of the carriage 3 on the reference side. The first horizontal contact portion 53 includes a first horizontal end surface 53a and a first taper surface 53b. The first horizontal end surface 53a is an end surface of the first horizontal contact portion 53 on the reference side and is a plane along the sub scanning direction D2 and the height direction D3.

The first taper surface 53b is a plane of the first horizontal contact portion 53 that continues from the first horizontal end surface 53a in the first driving direction D21 and is formed to be inclined with respect to the sub scanning direction D2.

The second horizontal contact portion 54 is provided at an end of the carriage 3 on the shift side. The second horizontal contact portion 54 includes a second horizontal end surface 54a and a second taper surface 54b. The second horizontal end surface 54a is an end surface of the second horizontal contact portion 54 on the shift side and is a plane along the sub scanning direction D2 and the height direction D3.

The second taper surface 54b is a plane of the second horizontal contact portion 54 that continues from the second horizontal end surface 54a in the second driving direction D22 and is formed to be inclined with respect to the sub scanning direction D2.

The first biasing portion 55 has a function to guide the carriage 3 from a position corresponding to a state where the rail member 51 fits in the first concave portion 521 to a position corresponding to a state where the rail member 51 fits in the second concave portion 522. In addition, the second biasing portion 56 has a function to guide the carriage 3 from a position corresponding to a state where the rail member 51 fits in the second concave portion 522 to a position corresponding to a state where the rail member 51 fits in the first concave portion 521.

The first biasing portion 55 is disposed at a position on the reference side corresponding to the first horizontal contact portion 53. The first biasing portion 55 biases, in the shift direction D11, the carriage 3 that has moved in the first driving direction D21 in a state where the rail member 51 fits in the first concave portion 521 and has reached the second scan end P2.

The second biasing portion 56 is disposed at a position on the shift side corresponding to the second horizontal contact portion 54. The second biasing portion 56, in the return direction D12, the carriage 3 that has moved in the second driving direction D22 in a state where the rail member 51 fits in the second concave portion 522 and has reached the first scan end P1.

As shown in FIG. 5 and FIG. 10 to FIG. 14, the first biasing portion 55 includes a first abutting member 550, a first movable support portion 551, and a spring 552. The first movable support portion 551 supports the first abutting member 550 such that the first abutting member 550 can be displaced in a predetermined range in the sub scanning direction D2.

The first abutting member 550 includes a first inner end surface 55a and a first abutting surface 55b. The first inner end surface 55a is an end surface of the first abutting member 550 in the shift direction D11 and is a plane along the sub scanning direction D2 and the height direction D3.

The first abutting surface 55b is a plane of the first abutting member 550 that continues from the first inner end surface 55a in the second driving direction D22 and is formed to be inclined with respect to the sub scanning direction D2. The spring 552 is configured to elastically bias the first abutting member 550 in the second driving direction D22.

As shown in FIG. 5 and FIG. 10 to FIG. 14, the second biasing portion 56 includes a second abutting member 560, a second movable support portion 561, and a spring 562. The second movable support portion 561 supports the second abutting member 560 such that the second abutting member 560 can be displaced in a predetermined range in the sub scanning direction D2.

The second abutting member 560 includes a second inner end surface 56a and a second abutting surface 56b. The second inner end surface 56a is an end surface of the second abutting member 560 in the return direction D12 and is a plane along the sub scanning direction D2 and the height direction D3.

The second abutting surface 56b is a plane of the second abutting member 560 that continues from the second inner end surface 56a in the first driving direction D21 and is formed to be inclined with respect to the sub scanning direction D2. The spring 562 is configured to elastically bias the second abutting member 560 in the first driving direction D21.

As shown in, for example, FIG. 5, the rail member 51 includes first guide grooves 511 and second guide grooves 512. The first guide grooves 511 cross over portions of the rail member 51 that are close to its end on the downstream side in the first driving direction D21. The second guide grooves 512 cross over portions of the rail member 51 that are close to its end on the upstream side in the first driving direction D21.

In the present embodiment, the first guide grooves 511 diagonally cross over the rail member 51 from an upstream side in the first driving direction D21 of the reference side in the main scanning direction D1 to a downstream side in the first driving direction D21 of the shift side in the main scanning direction D1.

In addition, the second guide grooves 512 diagonally cross over the rail member 51 from an upstream side in the second driving direction D22 of the shift side in the main scanning direction D1 to a downstream side in the second driving direction D22 of the reference side in the main scanning direction D1.

When the carriage 3 is biased by the first biasing portion 55, the first guide grooves 511 guide the boundary portion 523 of the lower slide member 52 from the reference side to the shift side in the main scanning direction D1 with respect to the rail member 51. This allows the first guide grooves 511 to guide the carriage 3 from the second scan end P2 of the reference position to the return start point P4 of the shift position.

When the carriage 3 is biased by the second biasing portion 56, the second guide grooves 512 guide the boundary portion 523 of the lower slide member 52 from the shift side to the reference side in the main scanning direction D1 with respect to the rail member 51. This allows the second guide grooves 512 to guide the carriage 3 from the first scan end P1 of the shift position to the forward-way start point P3 of the reference position.

[Image Reading Process Using ADF 13]

The following describes how the carriage 3 moves when the image reading process using the ADF 13 is performed.

When the image reading process using the ADF 13 is performed, the motor control device 82a controls the motor 43 to position the carriage 3 to the stop reading position P0 at the reference position.

For example, when, in the initial state, the carriage 3 is located at the stop reading position P0 at the reference position, the motor control device 82a keeps the motor 43 stopped.

In addition, when, in the initial state, the carriage 3 is located between the stop reading position P0 and the first scan end P1 at the reference position, or located at the first scan end P1 at the reference position, the motor control device 82a rotates the motor 43 in the second rotation direction R2, thereby moving the carriage 3 to the stop reading position P0.

When the carriage 3 moves, at the reference position in the main scanning direction D1, from a position between the stop reading position P0 and the first scan end P1 toward the first driving direction D21 or the second driving direction D22, the first concave portion 521 of the lower slide member 52 and the rail member 51 guide the carriage 3 in the sub scanning direction D2.

Figure 10:
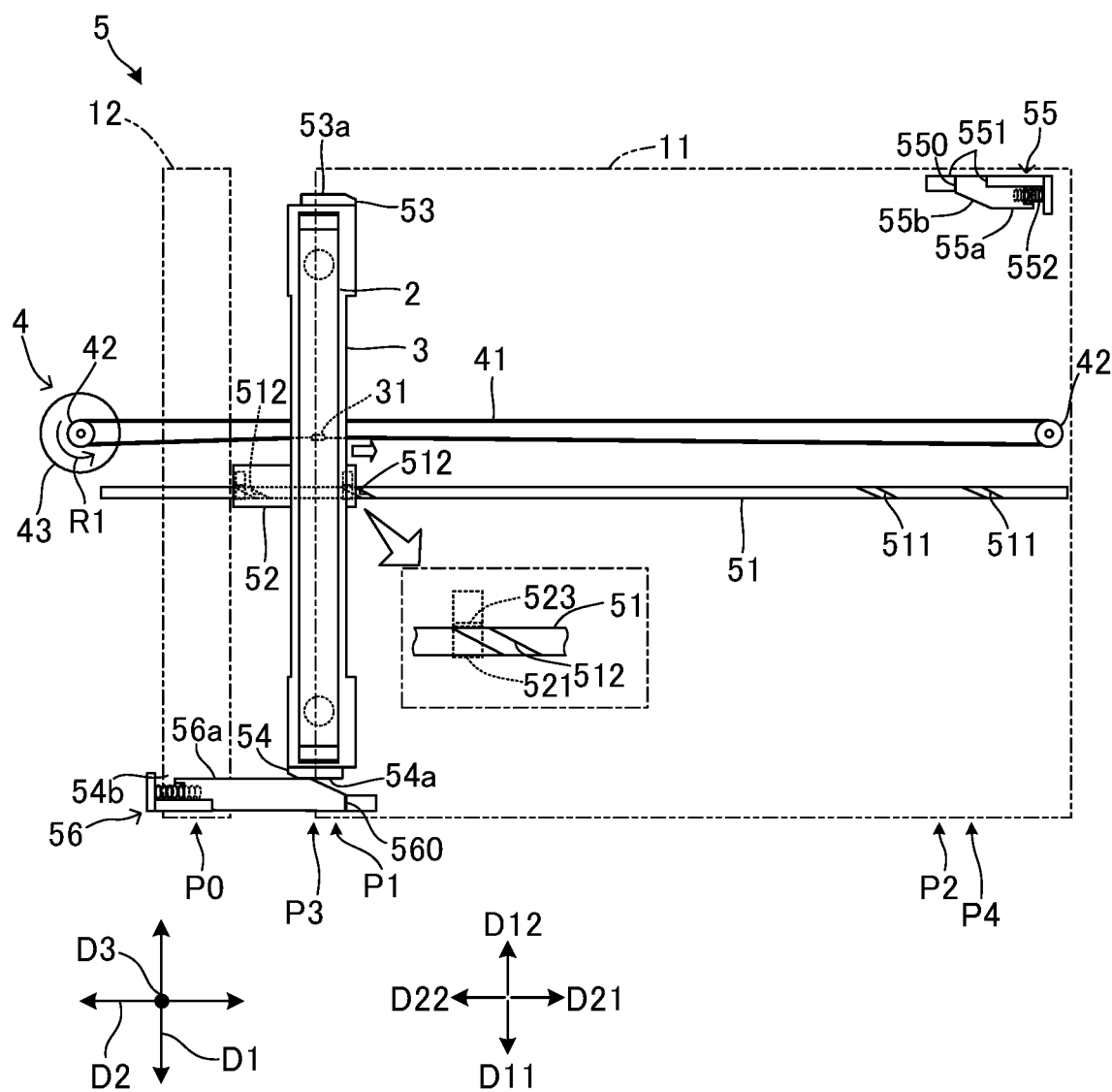
FIG. 10 is a plan diagram of the drive mechanism and the guide mechanism when the carriage has moved in the first driving direction and reached a forward-way start point in the image reading device according to the embodiment.

It is noted that when the carriage 3 reaches the forward-way start point P3 at the reference position, the boundary portion 523 of the lower slide member 52 reaches a position of the second guide grooves 512, and the restriction imposed by the rail member 51 on the movement of the carriage 3 in the shift direction D11 is removed (see FIG. 10).

However, when the carriage 3 is located at the forward-way start point P3 at the reference position, the second inner end surface 56a of the second abutting member 560 comes in contact with the second horizontal end surface 54a of the second horizontal contact portion 54. This restricts the carriage 3 from moving in the shift direction D11, and the carriage 3 is held at the reference position in the main scanning direction D1.

The image reading device 1 includes a carriage sensor and a rotation sensor that are not shown. The carriage sensor detects the carriage 3 when it reaches a predetermined position in the sub scanning direction D2. The rotation sensor counts the number of rotations of the motor 43.

The motor control device 82a identifies the position of the carriage 3 based on the number of rotations of the motor 43 counted by the rotation sensor, the counting being started as the carriage sensor detects the carriage 3. Furthermore, the motor control device 82a determines, based on the identified position of the carriage 3, a timing at which to stop the motor 43.

After the carriage 3 is positioned to the stop reading position P0, the motor control device 82a causes a motor (not shown) included in the ADF 13. This allows the document sheet 9 to be conveyed along the document sheet conveyance path 130. Furthermore, the CIS control device 82b causes the CIS unit 2 to operate at a predetermined timing. This allows the CIS unit 2 to read an image from the document sheet 9 passing on the contact glass 12.

[Image Reading Process by Flatbed System]

The following describes how the carriage 3 moves when the image reading process is performed by the flatbed system with reference to FIG. 10 to FIG. 14.

When the image reading process is performed by the flatbed system, first, the motor control device 82a controls the motor 43 to position the carriage 3 to the forward-way start point P3 at the reference position.

When in the initial state, the carriage 3 is located at the forward-way start point P3 at the reference position, the motor control device 82a keeps the motor 43 stopped.

In addition, when, in the initial state, the carriage 3 is located at the stop reading position P0 at the reference position, or located between the stop reading position P0 and the forward-way start point P3 at the reference position, the motor control device 82a rotates the motor 43 in the first rotation direction R1, thereby moving the carriage 3 to the forward-way start point P3.

When the carriage 3 moves, at the reference position in the main scanning direction D1, from a position between the stop reading position P0 and the forward-way start point P3 in the first driving direction D21, the first concave portion 521 of the lower slide member 52 and the rail member 51 guide the carriage 3 in the sub scanning direction D2.

In addition, when the carriage 3 passes the forward-way start point P3 at the reference position, the second inner end surface 56a of the second abutting member 560 restricts the carriage 3 from moving in the shift direction D11.

Subsequently, the motor control device 82a rotates the motor 43 in the first rotation direction R1 so that the carriage 3 moves from the forward-way start point P3 at the reference position to the second scan end P2 via the first scan end P1.

While the carriage 3 moves, at the reference position in the main scanning direction D1, from the forward-way start point P3 to the second scan end P2, the first concave portion 521 of the lower slide member 52 and the rail member 51 guide the carriage 3 in the sub scanning direction D2.

In addition, while the carriage 3 moves from the first scan end P1 to the second scan end P2, the CIS control device 82b causes the CIS unit 2 to operate. This allows the CIS unit 2 to read an image from the document sheet 9 on the platen glass 11.

In the following description, the primary image data Id1 that is obtained by the operation of the CIS unit 2 while the carriage 3 moves from the first scan end P1 to the second scan end P2, is referred to as forward-way image data.

In the present embodiment, the range from the first scan end P1 to the second scan end P2 in the sub scanning direction D2 is an example of the predetermined scan range.

When the carriage 3 moves in the first driving direction D21 in the scan range in the sub scanning direction D2, the pair of upper slide portions 20 slide under the lower surfaces of the first interval maintaining portions 61 of the pair of interval maintaining members 6.

As a result, the first interval maintaining portions 61 maintain a predetermined first interval between the carriage 3 and the platen glass 11 when the carriage 3 moves in the first driving direction D21 in the scan range in the sub scanning direction D2. The first interval corresponds to the thickness of the first interval maintaining portion 61.

Figure 11:
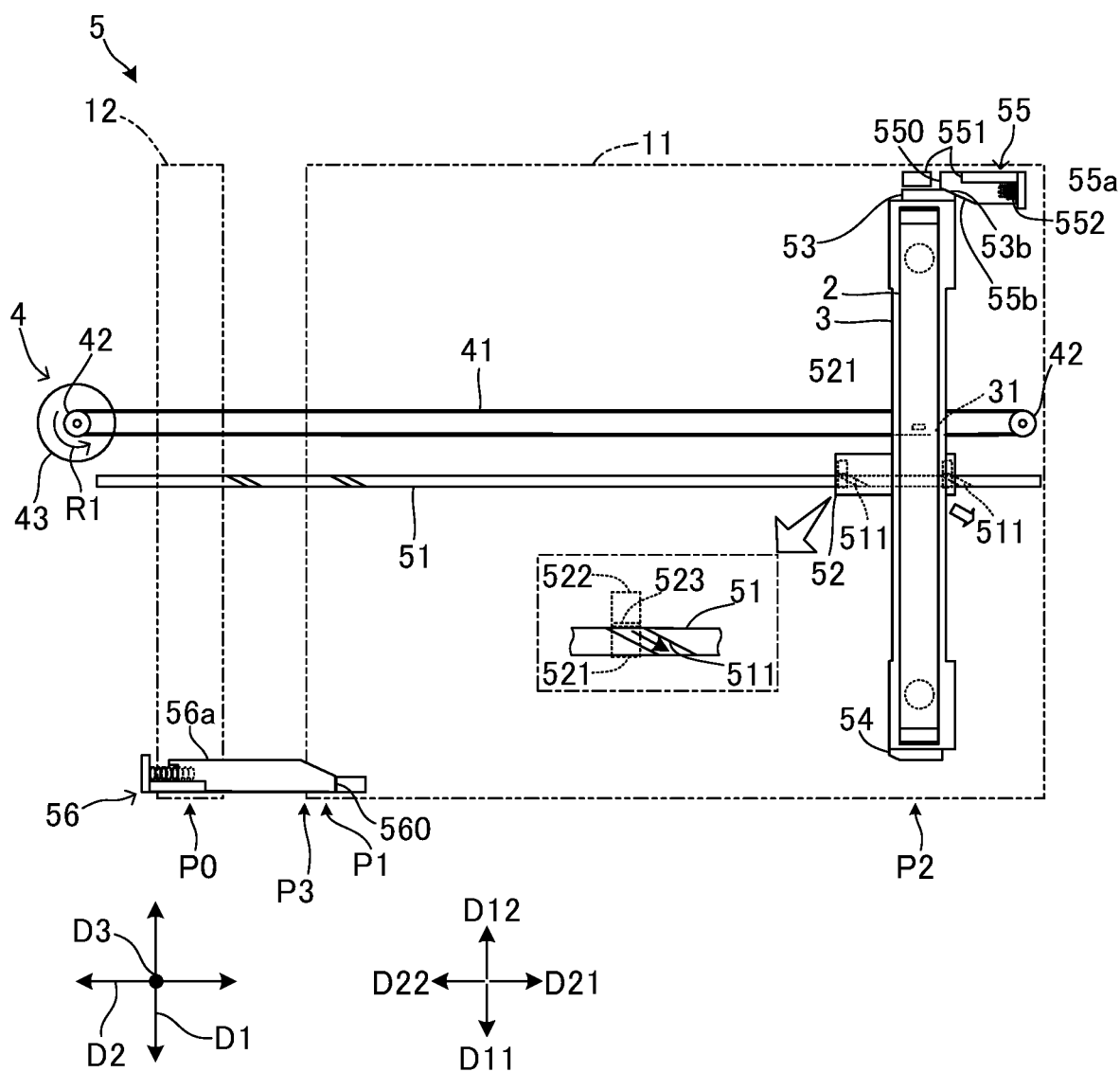
FIG. 11 is a plan diagram of the drive mechanism and the guide mechanism when the carriage has moved in the first driving direction and reached a second scan end in the image reading device according to the embodiment.

When the carriage 3 reaches the second scan end P2 at the reference position, the boundary portion 523 of the lower slide member 52 reaches a position of the first guide grooves 511, and the restriction imposed by the rail member 51 on the movement of the carriage 3 in the shift direction D11 is removed (see FIG. 11).

Furthermore, when the carriage 3 reaches the second scan end P2 at the reference position, the first taper surface 53$b$ of the first horizontal contact portion 53 abuts and slides on the first abutting surface 55$b$ of the first abutting member 550. This allows the first abutting member 550 to bias the carriage 3 in the shift direction D11.

That is, when the carriage 3 reaches the second scan end P2 at the reference position, a driving force in the first driving direction D21 is applied to the carriage 3 by the drive device 4, and the carriage 3 is biased in the shift direction D11 by the first abutting member 550 of the first biasing portion 55. This allows the carriage 3 to move in the first driving direction D21 and the shift direction D11.

In the present embodiment, the first taper surface 53$b$ of the first horizontal contact portion 53 abuts on the first abutting surface 55$b$ of the first abutting member 550 before the carriage 3 reaches the second scan end P2 at the reference position.

However, until the carriage 3 reaches the second scan end P2, the first abutting member 550 is displaced in the first driving direction D21 by a pressure received from the first horizontal contact portion 53. Subsequently, when the carriage 3 reaches the second scan end P2, the first movable support portion 551 restricts the first abutting member 550 from being displaced in the first driving direction D21. This allows the first abutting member 550 to bias the carriage 3 in the shift direction D11.

In addition, when the carriage 3 reaches the second scan end P2 at the reference position, the first guide grooves 511 guide the boundary portion 523 of the lower slide member 52 to diagonally cross over the rail member 51 from an upstream side in the first driving direction D21 of the reference side in the main scanning direction D1 to a downstream side in the first driving direction D21 of the shift side in the main scanning direction D1. This allows the carriage 3 to move smoothly from the reference side to the shift side.

In the present embodiment, a position of the carriage 3 when the boundary portion 523 of the lower slide member 52 has crossed over to the shift side along the first guide grooves 511 is the return start point P4 at the shift position.

While the carriage 3 moves from the second scan end P2 at the reference position to the return start point P4 at the shift position, the pair of upper slide portions 20 slide under the lower surfaces of the first transfer portions 64 of the pair of interval maintaining members 6 (see FIG. 8).

In addition, while the carriage 3 moves from the return start point P4 at the shift position to the second scan end P2, the pair of upper slide portions 20 slide under the lower surfaces of the first transfer portions 64, the first slant surfaces 63, and the second interval maintaining portions 62 of the pair of interval maintaining members 6 (see FIG. 8).

At a timing when the carriage 3 reaches the return start point P4 at the shift position, the motor control device 82$a$ reverses the rotation of the motor 43 from the first rotation direction R1 to the second rotation direction R2.

When the carriage 3 has moved to the shift position, the first abutting member 550 is displaced in the second driving direction D22 by a force received from the spring 552 to return to the original position. The first inner end surface 55$a$ of the first abutting member 550 that has returned to the original position comes in contact with the first horizontal end surface 53$a$ of the first horizontal contact portion 53 (see FIG. 12). This restricts the carriage 3 from moving in the return direction D12, and holds the carriage 3 at the shift position in the main scanning direction D1.

The motor control device 82$a$ rotates the motor 43 in the second rotation direction R2 so that the carriage 3 moves from the return start point P4 at the shift position to the first scan end P1 via the second scan end P2.

While the carriage 3 moves from the return start point P4 to the first scan end P1 at the reference position in the main scanning direction D1, the second concave portion 522 of the lower slide member 52 and the rail member 51 guide the carriage 3 in the sub scanning direction D2.

In addition, when a predetermined high-precision mode is selected as the operation mode, the CIS control device 82$b$ causes the CIS unit 2 to operate while the carriage 3 moves from the second scan end P2 to the first scan end P1. This allows the CIS unit 2 to read an image from the document sheet 9 on the platen glass 11.

In the following description, the primary image data Id1 that is obtained by the operation of the CIS unit 2 while the carriage 3 moves from the second scan end P2 to the first scan end P1, is referred to as return-way image data.

In a case where a predetermined normal mode has been selected as the operation mode, the CIS control device 82$b$ does not cause the CIS unit 2 to move when the carriage 3 moves in the second driving direction D22.

That is, in the case where the normal mode has been selected, the CIS control device 82$b$ causes the CIS unit 2 to execute the image reading when the carriage 3 moves in the first driving direction D21, and subsequently, does not cause the CIS unit 2 to execute the image reading when the carriage 3 moves in the second driving direction D22.

In addition, in a case where the high-precision mode that is different from the normal mode has been selected as the operation mode, the CIS control device 82$b$ causes the CIS unit 2 to execute the image reading both when the carriage 3 moves in the first driving direction D21 and when the carriage 3 moves in the second driving direction D22. It is noted that the CIS control device 82$b$ is an example of the reading control portion.

When the carriage 3 moves in the scan range in the sub scanning direction D2, the pair of upper slide portions 20 slide under the lower surfaces of the second interval maintaining portions 62 of the pair of interval maintaining members 6.

Accordingly, the second interval maintaining portion 62 maintains a predetermined second interval between the carriage 3 and the platen glass 11 when the carriage 3 moves in the second driving direction D22 in the scan range in the sub scanning direction D2. The second interval corresponds to the thickness of the second interval maintaining portion 62. The second interval is thus smaller than the first interval.

Figure 13:
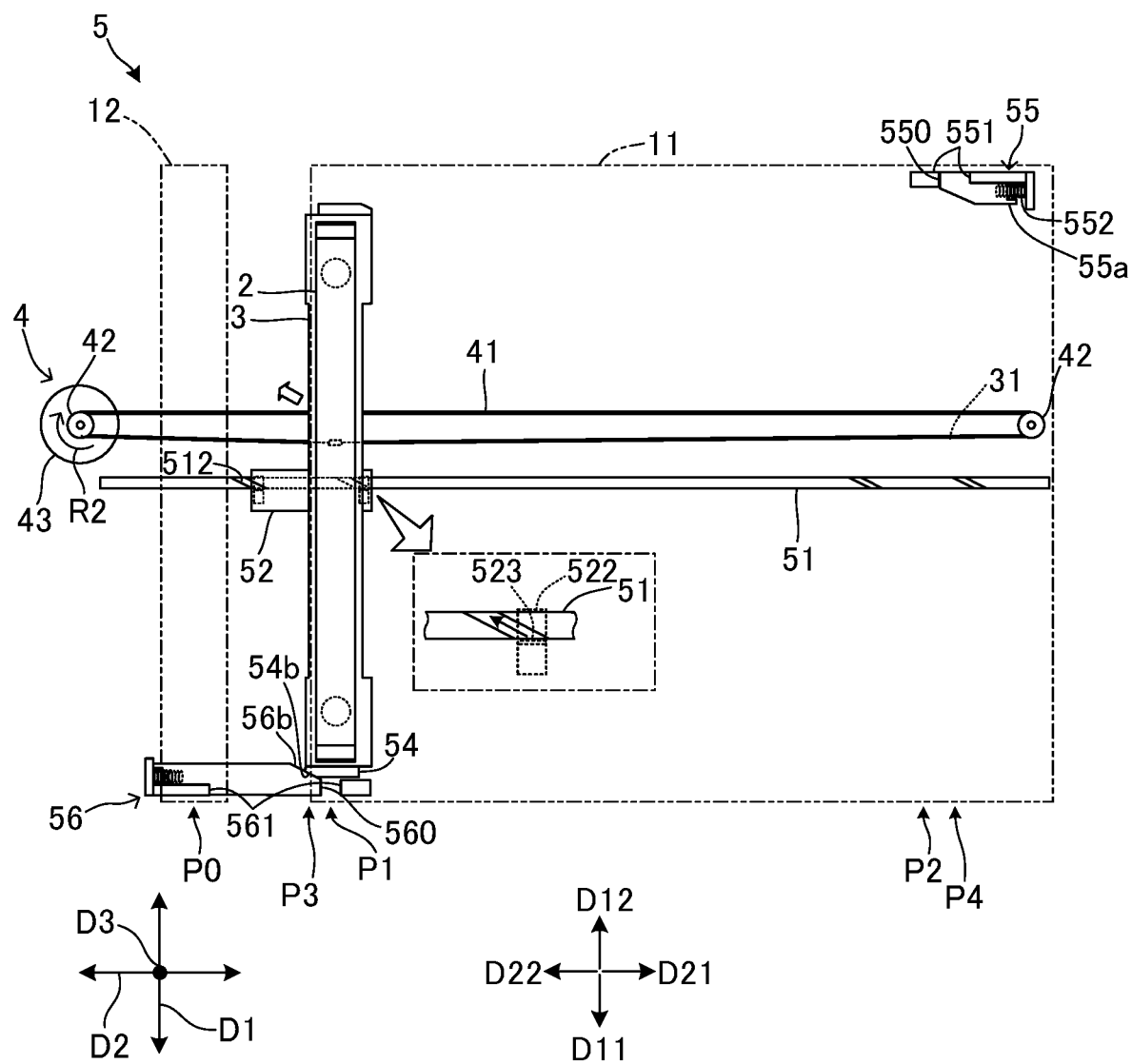
FIG. 13 is a plan diagram of the drive mechanism and the guide mechanism when the carriage has moved in the second driving direction and reached a first scan end in the image reading device according to the embodiment.

When the carriage 3 reaches the first scan end P1 at the shift position, the boundary portion 523 of the lower slide member 52 reaches the position of the second guide grooves 512, and the restriction imposed by the rail member 51 on the movement of the carriage 3 in the return direction D12 is removed (see FIG. 13).

Furthermore, when the carriage 3 reaches the first scan end P1 at the shift position, the second taper surface 54b of the second horizontal contact portion 54 abuts and slides on the second abutting surface 56b of the second abutting member 560. This allows the second abutting member 560 to bias the carriage 3 in the return direction D12.

That is, when the carriage 3 reaches the first scan end P1 at the shift position, a driving force in the second driving direction D22 is applied to the carriage 3 by the drive device 4, and the carriage 3 is biased in the return direction D12 by the second abutting member 560 of the second biasing portion 56. This allows the carriage 3 to move in the second driving direction D22 and the return direction D12.

In the present embodiment, the second taper surface 54b of the second horizontal contact portion 54 abuts on the second abutting surface 56b of the second abutting member 560 before the carriage 3 reaches the first scan end P1 at the shift position.

However, until the carriage 3 reaches the first scan end P1, the second abutting member 560 is displaced in the second driving direction D22 by a pressure received from the second horizontal contact portion 54. Subsequently, when the carriage 3 reaches the first scan end P1, the second movable support portion 561 restricts the second abutting member 560 from being displaced in the second driving direction D22. This allows the second abutting member 560 to bias the carriage 3 in the return direction D12.

In addition, when the carriage 3 reaches the first scan end P1 at the shift position, the second guide grooves 512 guide the boundary portion 523 of the lower slide member 52 to diagonally cross over the rail member 51 from an upstream side in the second driving direction D22 of the shift side in the main scanning direction D1 to a downstream side in the second driving direction D22 of the reference side in the main scanning direction D1. This allows the carriage 3 to move smoothly from the shift side to the reference side.

Figure 14:
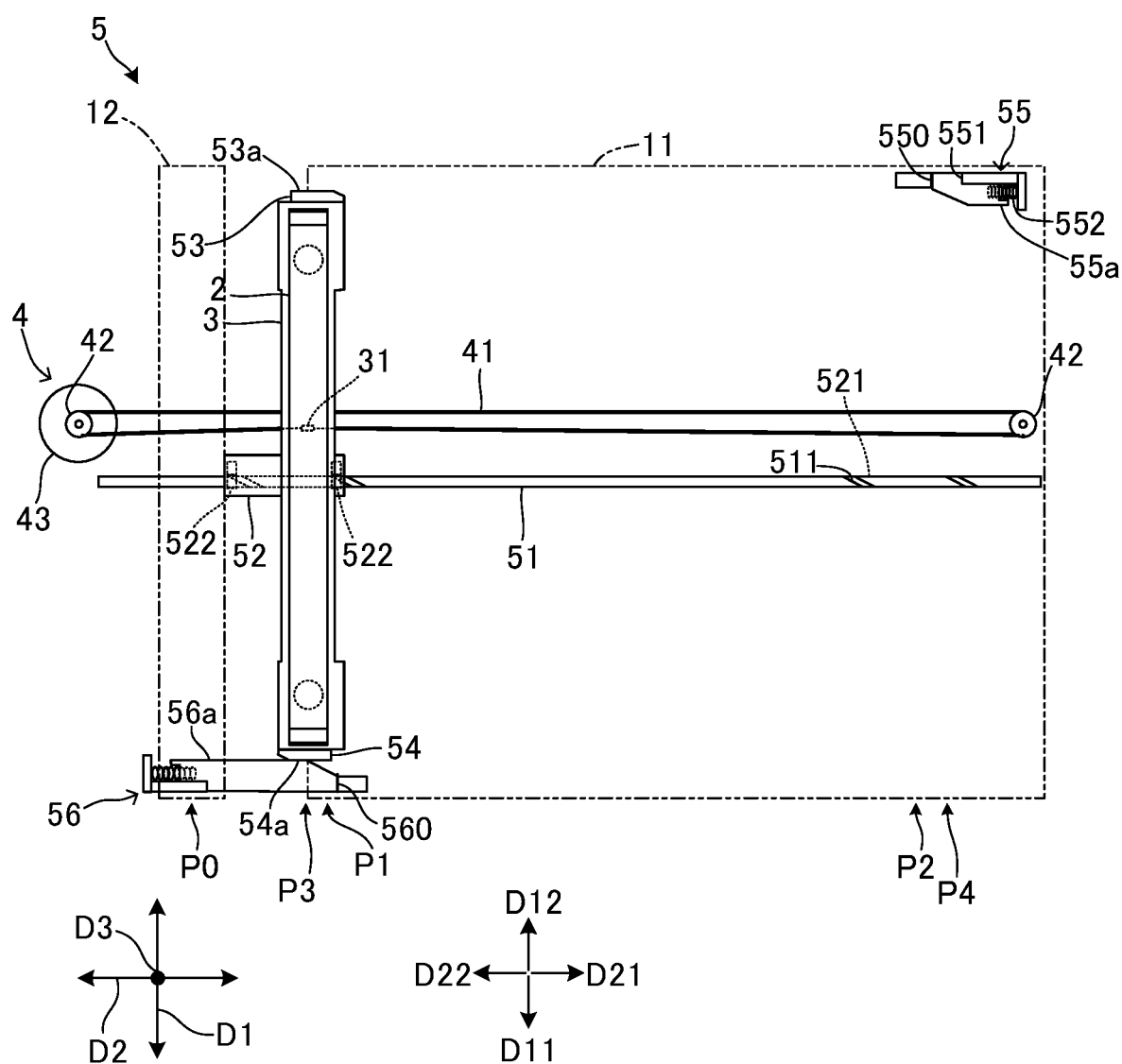
FIG. 14 is a plan diagram of the drive mechanism and the guide mechanism when the carriage has moved in the second driving direction and reached the forward-way start point in the image reading device according to the embodiment.

In the present embodiment, a position of the carriage 3 when the boundary portion 523 of the lower slide member 52 has crossed over to the reference side along the second guide grooves 512 is the forward-way start point P3 at the reference position (see FIG. 14).

While the carriage 3 moves from the first scan end P1 at the shift position to the forward-way start point P3 at the reference position, the pair of upper slide portions 20 slide under the lower surfaces of the second transfer portions 66 of the pair of interval maintaining members 6 (see FIG. 9).

In addition, while the carriage 3 moves from the forward-way start point P3 at the reference position to the first scan end P1, the pair of upper slide portions 20 slide under the lower surfaces of the second transfer portions 66, the second slant surfaces 65, and the first interval maintaining portions 61 of the pair of interval maintaining members 6 (see FIG. 9).

It is noted that while the carriage 3 moves from the forward-way start point P3 at the reference position to the stop reading position P0, the pair of upper slide portions 20 slide under the lower surfaces of the second transfer portions 66, the third slant surfaces 67, and the first interval maintaining portions 61 of the pair of interval maintaining members 6 (see FIG. 9).

At a timing when the carriage 3 reaches the forward-way start point P3 at the reference position, the motor control device 82a stops the rotation of the motor 43.

When the carriage 3 has moved to the reference position, the second abutting member 560 is displaced in the first driving direction D21 by a force received from the spring 562 to return to the original position (see FIG. 14). The second inner end surface 56a of the second abutting member 560 that has returned to the original position comes in contact with the second horizontal end surface 54a of the second horizontal contact portion 54 (see FIG. 14). This restricts the carriage 3 from moving in the shift direction D11, and holds the carriage 3 at the reference position in the main scanning direction D1.

As described above, in a case where the driving force in the first driving direction D21 is applied to the carriage 3 in a state where the carriage 3 is located at the forward-way start point P3 at the reference position, the guide mechanism 5 guides the carriage 3 from the forward-way start point P3 at the reference position to the second scan end P2 in the sub scanning direction D2 (see FIG. 10, FIG. 11).

Figure 12:
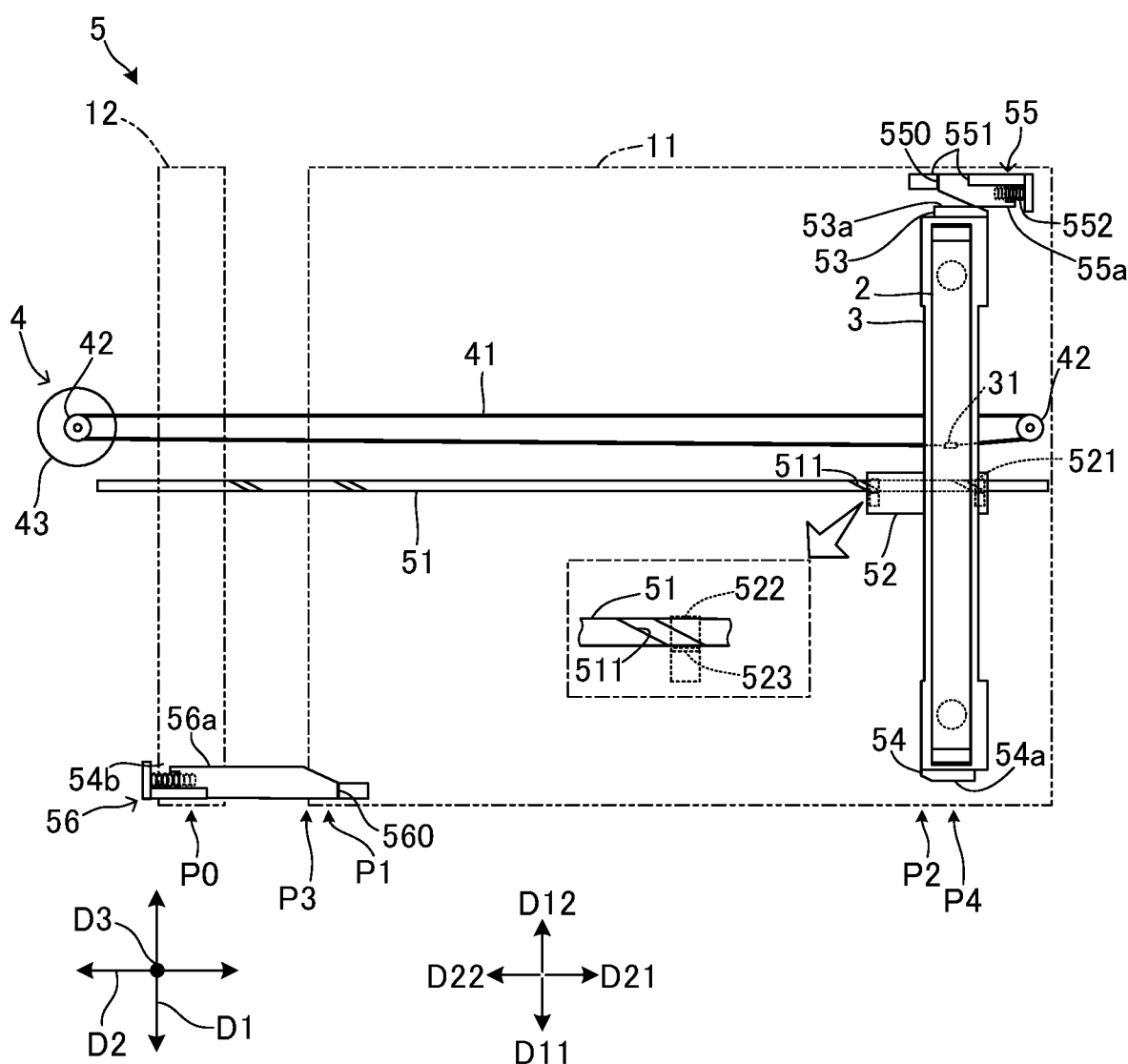
FIG. 12 is a plan diagram of the drive mechanism and the guide mechanism when the carriage has moved in the first driving direction and reached a return-way start point in the image reading device according to the embodiment.

Furthermore, after the carriage 3 reaches the second scan end P2 at the reference position, the guide mechanism 5 guides the carriage 3 from the second scan end P2 at the reference position to the return start point P4 at the shift position (see FIG. 11, FIG. 12). It is noted that the shift position is different, in the main scanning direction D1, from the reference position.

Furthermore, in a case where the driving force in the second driving direction D22 is applied to the carriage 3 in a state where the carriage 3 is located at the return start point P4 at the shift position, the guide mechanism 5 guides the carriage 3 from the return start point P4 to the first scan end P1 at the shift position in the sub scanning direction D2 (see FIG. 12, FIG. 13).

Furthermore, after the carriage 3 reaches the first scan end P1 at the shift position, the guide mechanism 5 guides the carriage 3 from the first scan end P1 at the shift position to the forward-way start point P3 at the reference position (see FIG. 13, FIG. 14).

When the normal mode has been selected, the image processing device 81 outputs the forward-way image data as the output image data. In addition, when the high-precision mode has been selected, the image processing device 81 generates the output image data by combining the forward-way image data and the return-way image data.

It is noted that the output image data generated by combining the forward-way image data and the return-way image data is an example of the secondary image data Id2. In addition, the normal mode is an example of the first operation mode, and the high-precision mode is an example of the second operation mode.

The image processing device 81 generates the output image data by combining data in the forward-way image data and data in the return-way image data that are shifted from each other in the main scanning direction D1 by a predetermined number of pixels. The predetermined number of pixels corresponds to a difference between the reference position and the shift position in the main scanning direction D1.

It is noted that corresponding pixels in the forward-way image data and the return-way image data are reversed in sort order in the sub scanning direction D2. As a result, the image processing device 81 reverses the sort order of pixels of the return-way image data in the sub scanning direction D2, shifts the pixels of the return-way image data in the main scanning direction D1, and then combines the forward-way image data and the return-way image data.

In a first example, the image processing device 81 generates the output image data by selecting, from each pair of corresponding pixels in the forward-way image data and the return-way image data, a pixel having a higher luminance.

In a second example, in generating the output image data, when a difference between corresponding pixels in the forward-way image data and the return-way image data exceeds a predetermined allowable difference, the image processing device 81 selects a pixel having a higher luminance, and otherwise, the image processing device 81 selects a pixel of the forward-way image data.

With the adoption of the image reading device 1, it is possible to, with a simple configuration, change the interval between the platen glass 11 and the CIS unit 2 in the forward way and the return way of the carriage 3. As a result, it is possible to obtain an image near to the original image from both a part of the document sheet 9 that is close to the platen glass 11 and a part of the document sheet 9 that is separated from the platen glass 11.

Application Example

In the following, a description is given of an application example of the image reading device 1.

In the pair of interval maintaining members 6 of the present application example, the second interval maintaining portion 62 is larger in thickness than the first interval maintaining portion 61. That is, the second interval is larger than the first interval.

In the present application example, in a case where the normal mode has been selected, the CIS control device 82*b* does not cause the CIS unit 2 to operate when the carriage 3 moves from the first scan end P1 to the second scan end P2 at the reference position, and causes the CIS unit 2 to operate when the carriage 3 moves from the second scan end P2 to the first scan end P1 at the shift position.

Furthermore, in the present application example, in a case where the normal mode has been selected, the image processing device 81 outputs the return-way image data as the output image data.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
a carriage supported in such a way as to move along a lower surface of a platen glass, and configured to support a contact image sensor unit such that the contact image sensor unit can approach and separate from the platen glass in a state of being along a main scanning direction, and to elastically bias the contact image sensor unit toward the platen glass;
a drive device configured to apply a driving force to the carriage in a first driving direction or a second driving direction that go along a sub scanning direction perpendicular to the main scanning direction, the second driving direction being opposite to the first driving direction;
a guide mechanism configured to guide a moving direction of the carriage to which the driving force is applied; and
an interval maintaining member provided along the lower surface of the platen glass and configured to maintain a predetermined interval between the contact image sensor unit and the platen glass by coming in contact with an upper slide portion on an upper surface of the contact image sensor unit, wherein
in a case where a driving force in the first driving direction is applied to the carriage in a state where the carriage is located at a predetermined first position, the guide mechanism guides the carriage from the first position to a predetermined second position in the sub scanning direction; after the carriage reaches the second position, the guide mechanism guides the carriage from the second position to a third position that is different, in the main scanning direction, from the second position; in a case where a driving force in the second driving direction is applied to the carriage in a state where the carriage is located at the third position, the guide mechanism guides the carriage from the third position to a predetermined fourth position in the sub scanning direction; and after the carriage reaches the fourth position, the guide mechanism guides the carriage from the fourth position to the first position,
the interval maintaining member includes:
a first interval maintaining portion configured to maintain a predetermined first interval between the carriage and the platen glass when the carriage moves in the first driving direction in a predetermined scan range in the sub scanning direction; and
a second interval maintaining portion configured to maintain a predetermined second interval between the carriage and the platen glass when the carriage moves in the second driving direction in the scan range, the second interval being different from the first interval, and
the first interval maintaining portion and the second interval maintaining portion are formed to extend in the sub scanning direction and adjacent to each other in the main scanning direction.

2. The image reading device according to claim 1, wherein
the guide mechanism includes:
a lower slide member formed integrally with the carriage, wherein in the lower slide member, a first concave portion and a second concave portion are formed adjacent to each other in the main scanning direction;
a rail member fixed below the carriage, formed to extend in the sub scanning direction, and configured to: when a driving force in the first driving direction is applied to the carriage in a state where the rail member fits in the first concave portion, guide the carriage in the sub scanning direction from the first position to the second position; and
when a driving force in the second driving direction is applied to the carriage in a state where the rail member fits in the second concave portion, guide the carriage in the sub scanning direction from the third position to the fourth position;
a first biasing portion configured to bias, from a first side to a second side in the main scanning direction with respect to the rail member, the carriage that has moved in the first driving direction in a state where the rail member fits in the first concave portion and has reached the second position; and
a second biasing portion configured to bias, from the second side to the first side in the main scanning direction with respect to the rail member, the carriage that has moved in the second driving direction in a state where the rail member fits in the second concave portion and has reached the fourth position, and
the rail member includes:
a first guide groove that crosses over a portion of the rail member that is close to an end thereof on a downstream side in the first driving direction, wherein when the carriage is biased by the first biasing portion, the first guide groove guides a boundary portion between the first concave portion and the second concave portion of the lower slide member from the first side to the second side in the main scanning direction with respect to the rail member, thereby guiding the carriage from the second position to the third position; and a second guide groove that crosses over a portion of the rail member that is close to an end thereof on an upstream side in the first driving direction, wherein when the carriage is biased by the second biasing portion, the second guide groove guides the boundary portion of the lower slide member from the second side to the first side in the main scanning direction with respect to the rail member, thereby guiding the carriage from the fourth position to the first position.

3. The image reading device according to claim 2, wherein when a driving force in the first driving direction is applied to the carriage by the drive device, and the carriage is biased by the first biasing portion, the first guide groove guides the boundary portion of the lower slide member to diagonally cross over the rail member from an upstream side in the first driving direction of the first side in the main scanning direction to a downstream side in the first driving direction of the second side in the main scanning direction, and when a driving force in the second driving direction is applied to the carriage by the drive device, and the carriage is biased by the second biasing portion, the second guide groove guides the boundary portion of the lower slide member to diagonally cross over the rail member from an upstream side in the second driving direction of the second side in the main scanning direction to a downstream side in the second driving direction of the first side in the main scanning direction.

4. The image reading device according to claim 1, further comprising:

an image processing device configured to generate output image data by combining data in forward-way image data and data in return-way image data that are shifted from each other in the main scanning direction by a predetermined number of pixels, the forward-way image data being obtained by the contact image sensor unit while the carriage moves in the first driving direction, the return-way image data being obtained by the contact image sensor unit while the carriage moves in the second driving direction.

5. The image reading device according to claim 4, further comprising:

a reading control portion configured to, in a case where a first operation mode has been selected, cause the contact image sensor unit to execute image reading when the carriage moves in the first driving direction, and subsequently, does not cause the contact image sensor unit to execute the image reading when the carriage moves in the second driving direction, and in a case where a second operation mode different from the first operation mode has been selected, cause the contact image sensor unit to execute the image reading both when the carriage moves in the first driving direction and when the carriage moves in the second driving direction, wherein the second interval is smaller than the first interval, and when the first operation mode has been selected, the image processing device outputs the forward-way image data as the output image data, and when the second operation mode has been selected, the image processing device generates the output image data by combining the forward-way image data and the return-way image data.

6. An image reading device comprising:

a carriage supported in such a way as to move along a lower surface of a platen glass, and configured to support a contact image sensor unit such that the contact image sensor unit can approach and separate from the platen glass in a state of being along a main scanning direction, and to elastically bias the contact image sensor unit toward the platen glass;

a drive device configured to apply a driving force to the carriage in a first driving direction or a second driving direction that go along a sub scanning direction perpendicular to the main scanning direction, the second driving direction being opposite to the first driving direction;

a guide mechanism configured to guide a moving direction of the carriage to which the driving force is applied; and an interval maintaining member provided along the lower surface of the platen glass and configured to maintain a predetermined interval between the contact image sensor unit and the platen glass by coming in contact with an upper slide portion on an upper surface of the contact image sensor unit, wherein in a case where a driving force in the first driving direction is applied to the carriage in a state where the carriage is located at a predetermined first position, the guide mechanism guides the carriage from the first position to a predetermined second position in the sub scanning direction; after the carriage reaches the second position, the guide mechanism guides the carriage from the second position to a third position that is different, in the main scanning direction, from the second position; in a case where a driving force in the second driving direction is applied to the carriage in a state where the carriage is located at the third position, the guide mechanism guides the carriage from the third position to a predetermined fourth position in the sub scanning direction; and after the carriage reaches the fourth position, the guide mechanism guides the carriage from the fourth position to the first position, the interval maintaining member includes:
 a first interval maintaining portion configured to maintain a predetermined first interval between the carriage and the platen glass when the carriage moves in the first driving direction in a predetermined scan range in the sub scanning direction; and
 a second interval maintaining portion configured to maintain a predetermined second interval between the carriage and the platen glass when the carriage moves in the second driving direction in the scan range, the second interval being different from the first interval, and the guide mechanism includes:
 a lower slide member formed integrally with the carriage, wherein in the lower slide member, a first concave portion and a second concave portion are formed adjacent to each other in the main scanning direction; and
 a rail member fixed below the carriage, formed to extend in the sub scanning direction, and configured to: when a driving force in the first driving direction is applied to the carriage in a state where the rail member fits in the first concave portion, guide the carriage in the sub scanning direction from the first position to the second position; and when a driving force in the second driving direction is applied to the carriage in a state where the rail member fits in the second concave portion, guide the carriage in the sub scanning direction from the third position to the fourth position.

7. An image reading device comprising:

a carriage supported in such a way as to move along a lower surface of a platen glass, and configured to support a contact image sensor unit such that the contact image sensor unit can approach and separate from the platen glass in a state of being along a main scanning direction, and to elastically bias the contact image sensor unit toward the platen glass;

a drive device configured to apply a driving force to the carriage in a first driving direction or a second driving direction that go along a sub scanning direction perpendicular to the main scanning direction, the second driving direction being opposite to the first driving direction;

a guide mechanism configured to guide a moving direction of the carriage to which the driving force is applied; and an interval maintaining member provided along the lower surface of the platen glass and configured to maintain a predetermined interval between the contact image sensor unit and the platen glass by coming in contact with an upper slide portion on an upper surface of the contact image sensor unit, wherein in a case where a driving force in the first driving direction is applied to the carriage in a state where the carriage is located at a predetermined first position, the guide mechanism guides the carriage from the first position to a predetermined second position in the sub scanning direction; after the carriage reaches the second position, the guide mechanism guides the carriage from the second position to a third position that is different, in the main scanning direction, from the second position; in a case where a driving force in the second driving direction is applied to the carriage in a state where the carriage is located at the third position, the guide mechanism guides the carriage from the third position to a predetermined fourth position in the sub scanning direction; and after the carriage reaches the fourth position, the guide mechanism guides the carriage from the fourth position to the first position, the interval maintaining member includes:
  a first interval maintaining portion configured to maintain a predetermined first interval between the carriage and the platen glass when the carriage moves in the first driving direction in a predetermined scan range in the sub scanning direction; and
  a second interval maintaining portion configured to maintain a predetermined second interval between the carriage and the platen glass when the carriage moves in the second driving direction in the scan range, the second interval being different from the first interval, the guide mechanism includes:
  a lower slide member formed integrally with the carriage, wherein in the lower slide member, a first concave portion and a second concave portion are formed adjacent to each other in the main scanning direction;
  a rail member fixed below the carriage, formed to extend in the sub scanning direction, and configured to: when a driving force in the first driving direction is applied to the carriage in a state where the rail member fits in the first concave portion, guide the carriage in the sub scanning direction from the first position to the second position; and when a driving force in the second driving direction is applied to the carriage in a state where the rail member fits in the second concave portion, guide the carriage in the sub scanning direction from the third position to the fourth position;
  a first biasing portion configured to bias, from a first side to a second side in the main scanning direction with respect to the rail member, the carriage that has moved in the first driving direction in a state where the rail member fits in the first concave portion and has reached the second position; and
  a second biasing portion configured to bias, from the second side to the first side in the main scanning direction with respect to the rail member, the carriage that has moved in the second driving direction in a state where the rail member fits in the second concave portion and has reached the fourth position, and the rail member includes:
  a first guide groove that crosses over a portion of the rail member that is close to an end thereof on a downstream side in the first driving direction, wherein when the carriage is biased by the first biasing portion, the first guide groove guides a boundary portion between the first concave portion and the second concave portion of the lower slide member from the first side to the second side in the main scanning direction with respect to the rail member, thereby guiding the carriage from the second position to the third position; and
  a second guide groove that crosses over a portion of the rail member that is close to an end thereof on an upstream side in the first driving direction, wherein when the carriage is biased by the second biasing portion, the second guide groove guides the boundary portion of the lower slide member from the second side to the first side in the main scanning direction with respect to the rail member, thereby guiding the carriage from the fourth position to the first position.

* * * * *